United States Patent [19]

Thiele et al.

[11] Patent Number: 4,599,283
[45] Date of Patent: Jul. 8, 1986

[54] POWER CELL ASSEMBLY

[75] Inventors: Karl O. Thiele, Bloomfield Hills; Steven L. Toth, Pontiac, both of Mich.

[73] Assignee: Enertronics, Inc., Clawson, Mich.

[21] Appl. No.: 522,823

[22] Filed: Aug. 12, 1983

[51] Int. Cl.[4] ............... H01M 2/10; H01M 2/04; H01M 6/42

[52] U.S. Cl. .................. 429/99; 429/176; 429/159

[58] Field of Search ............ 429/96, 97, 98, 99, 429/100, 9, 122, 176, 159; 224/902

[56] References Cited

U.S. PATENT DOCUMENTS

| 414,626 | 11/1889 | Barrett | 429/100 |
|---|---|---|---|
| 974,220 | 11/1910 | West | 224/902 |
| 1,530,342 | 3/1925 | Barber | 224/902 |
| 1,779,207 | 10/1930 | Candor | 224/902 |
| 1,887,811 | 11/1932 | Ikin | 429/98 |
| 1,935,790 | 11/1933 | Dame | 224/902 |
| 2,190,601 | 2/1940 | Van | 224/902 |
| 2,295,143 | 9/1942 | Watkins | 224/902 |
| 2,357,274 | 8/1944 | Tresise et al. | 429/99 |
| 2,488,360 | 11/1949 | Williams | 429/100 |
| 2,582,072 | 1/1952 | Schwinn | 429/100 |
| 2,592,209 | 4/1952 | Stamper | 224/902 |
| 3,741,815 | 6/1973 | Peterson | 220/24 R |
| 3,887,394 | 6/1975 | Kaye | 429/99 |
| 3,956,019 | 5/1976 | Mabuchi et al. | 429/99 |
| 4,091,187 | 5/1978 | Kaye | 429/100 |
| 4,123,598 | 10/1978 | Hammel | 429/159 |

Primary Examiner—Donald L. Walton
Assistant Examiner—Gerard P. Rooney, Jr.
Attorney, Agent, or Firm—Reising, Ethington, Barnard, Perry & Milton

[57] ABSTRACT

A power cell assembly (10) for operating equipment such as video equipment (12) including a plurality of power cells (14). The power cells (14) are connected in series to operate video equipment (12). A housing supports the power cells (14) and includes nonconductive partitioning walls (36) within the housing (35) for insulating and separating the adjacent ones of the power cells (14) from each other. A method is provided for making the power cell assembly (10) including the steps of disposing the plurality of power cells (14) between the partitioning walls (36) of the base member (42) and adjacent the floor portion (44) thereof, electrically connecting the power cells (14) in series within the base member (42) and enclosing the connected power cells (14) to provide external insulation between the connected power cells (14) and the external environment.

43 Claims, 8 Drawing Figures

POWER CELL ASSEMBLY

TECHNICAL FIELD

This invention relates to power cell assemblies for supplying electrical power for electronic and other equipment, e.g., video equipment, such as a video camera. More specifically, the invention provides a casing for a plurality of nickel cadmium power cells in a novel method of assembling the power cell assembly.

BACKGROUND ART

Prior art power packs for video equipment comprise a variety of lead acid batteries. The power provided by these power packs are directly proportional to the size and weight of the power packs. Power packs having sufficient constant power output to operate a video camera for a reasonable length of time are burdensomely heavy. Even with the additional weight and size, these power packs do not satisfy the needs of most amateur and professional video enthusiasts.

A major problem for video equipment manufacturers is the packaging of the power packs. Prior art assemblies include a great amount of wasted space and further, there is a great concern among manufacturers that the packaging of the power packs should withstand the stresses encountered during use. Video power assemblies must be able to withstand a great deal of abuse during use.

This invention provides a power cell casing or packaging assembly which is compact yet provides structural support for a plurality of power cells contained therein. Unlike prior art shrink wrapped assemblies wherein a plastic casing is shrink wrapped around a plurality of power cells, this invention provides rigid internal support which shields the power cells from the external environment.

Power cells assemblies including rechargeable cells, such as nickel cadmium cells, have been found to provide greater power consistently over a significantly longer time span as compared to prior lead acid cell assemblies. The rechargeable cells are therefore quite economical. Optimally, naked nickel cadmium cells having an exposed charged pole and like charged cylindrical portion and an oppositely charged second pole are used. The use of such naked nickel cadmium cells present several problems. The cells are connected electrically in series. It would be quite awkward to have a single row or a stack of D size nickel cadmium cells, especially when power cell packs may require ten D size nickel cadmium cells. Hence, the cells must be arranged in a series of stacks having optimally two power cells in a stack and the charged cylindrical casings of adjacent stacks must be separated and insulated from each other. Secondly, the exposed oppositely charged poles of adjacent stacks must be electrically connected but the means connecting the cells, such as a conductive strip or wire, extending from a charged pole must be separated and insulated from the oppositely charged casing of the same cell, the casing usually extending over the charged pole and insulated from the pole internally. External insulation is required between the charged casing and the conductive connector. Thirdly, the charged naked cells must be insulated from the external environment while being encapsulated in a protected container. This invention provides a casing for insulating the naked nickel cadmium power cells internally and externally while further providing structural rigidity internally and protection from external abuse. Finally, this invention provides a novel process for manufacturing the power cell assembly wherein the power cells are lined and connected in series within the casing itself. In other words, the casing is an assembly tool in which the power cells are electrically connected.

STATEMENT OF THE INVENTION

In accordance with the present invention, there is provided a portable video power cell casing assembly for housing a plurality of power cells operatively connected together and each of which having a charged first pole and a like charged cylindrical portion and a second oppositely charged pole, the assembly including an outer nonconductive housing for supporting the cells and the connectors which operatively connect the cells, and characterized by partitioning means for separating and insulating the charged cylinder portion of adjacent aligned power cells from each other.

The present invention further provides a method of making the power cell assembly including the steps of disposing a plurality of the power cells between the partitioning walls of a base member and adjacent the floor portion thereof, electrically connecting the power cells in series within the base member, and enclosing the connected power cells to provide external insulation between the connected power cells and the external environment.

DESCRIPTION OF THE DRAWINGS

An embodiment of a video power pack assembly constructed in accordance with the present invention will now be described, by way of example only, with reference to the accompanying drawings, in which.

DETAILED DESCRIPTION OF THE DRAWINGS

Figure 1:
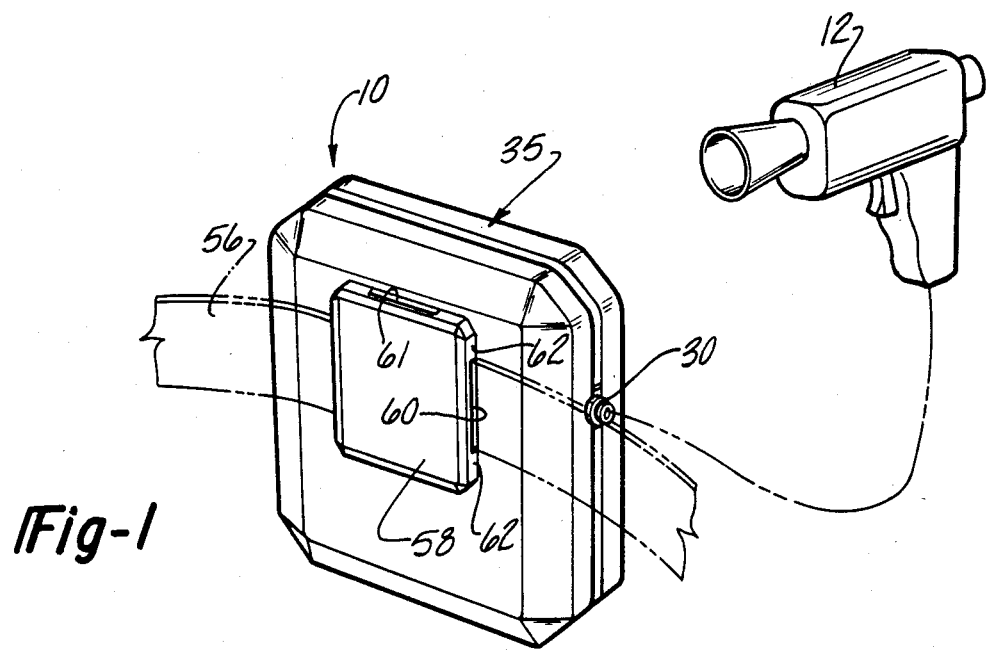
FIG. 1 is a perspective rear view of the subject assembly schematically connected to a video camera.
Figure 2:
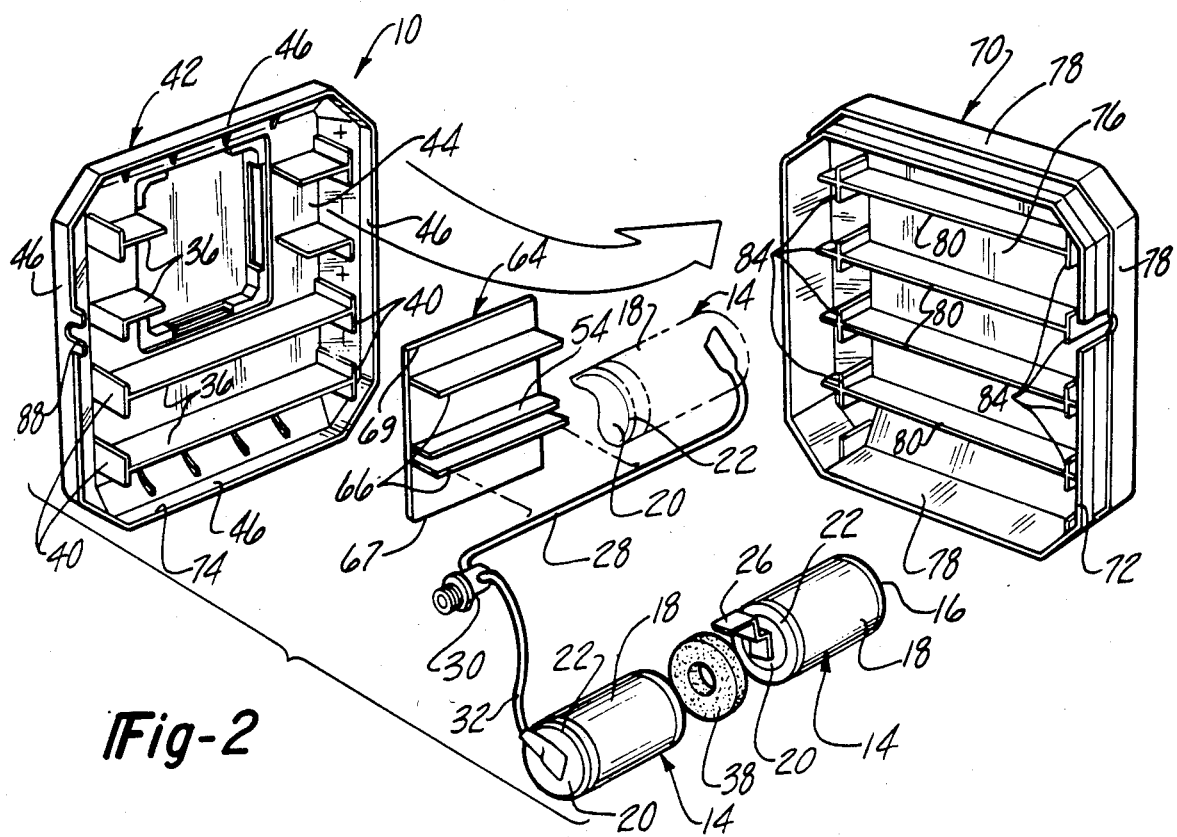
FIG. 2 is an exploded perspective view of the subject assembly.

Referring to the Figures, a power cell assembly for operating video equipment constructed in accordance with the invention is generally shown at 10. As shown in FIG. 1, the assembly 10 may be operatively connected to a video camera 12. Alternatively, the power cell assembly may be operatively connected to other video equipment.

The assembly 10 includes a plurality of power cells generally indicated at 14. Each of the power cells 14 has a charged first pole 16 and a like charged cylindrical portion 18. Generally, the first pole 16 and like charged cylindrical portion 18 have a negative charge. Each power cell 14 has an oppositely charged second pole 20. The second pole has a positive charge. The charged cylindrical portion 18 may have an end portion 22 which is wrapped around the oppositely charged second pole 20. An insulating washer is disposed between the wrapped portion 22 of the charged cylindrical portion 18 and the oppositely charged second pole 20 of the power cell 14 to prevent shorting of the cell. The assembly 10 further includes connector means for electrically connecting each of the power cells 14 in series to operate the video equipment 12. More specifically, the power cells 14 are aligned in the assembly 10 in five stacks or rows, each stack including two power cells 14. Each stack has an exposed first pole 16 and second pole 20. The connector means includes conductive strips 26 which interconnect the oppositely charged poles 16 and 20 of adjoining stacks of cells. Internally, each stack has a positively charged second pole 20 which is operatively connected to the negatively charged cylindrical portion of the other cells in the same stack by conductive connector strips 26. The series is completed by a first wire 28 which electrically connects the positively charged second pole 20 of end cell 14a to an adaptor member 30 and a second wire 32 which connects the negatively charged first pole 16 of the other end cell 14b to the adaptor 30. The adaptor 30 may receive a plug member from the the video equipment 12. Thusly, the connector means electrically connects each of the power cells 14 in series.

The assembly 10 includes an outer nonconductive housing generally indicated at 35 in FIG. 1 for supporting the power cells 14 and the connector means thereof. The assembly 10 is characterized by including nonconductive partitioning means within the housing means 35 for insulating and separating the charged cylindrical portions 18 of adjacent ones of the power cells 14 from each other. More particularly, the partitioning means includes four partitioning walls 36 extending across the housing means 35 for separating the charged cylindrical portions 18 of adjacently aligned power cells 14. The partitioning walls are flexible yet provide substantial structural rigidity against compression as will be discussed further below. The power cells 14 made from various manufacturers are found to have a size range within a small range of tolerances. The partitioning walls 36 are spaced so as to be able to contain and align the power cells 14 therebetween whereby there is sufficient space for the slight variation in the sizes of the power cells from various manufacturers. Thusly, the partitioning walls 36 align the power cells 14 into five rows or stacks, each stack including two of the power cells 14. Thusly, each power cell is insulated from the adjacent power cell of the adjacent stack. Nonconductive washer members 38 insulate each cell in the stack from the aligned other cell 14 in the stack. The washers 38 also serve as compressible spacers to accommodate variances in tolerances of the cells. The conductive strips 26 have one end connected to the positively charged second pole 20 of one of the cells and another end fixedly secured to the negatively charged cylindrical portion 18 of the other cell in the stack. The strip 26 extends through an opening in the center of each washer 38.

The partitioning means further includes connector insulator means insulating and separating the connector strips 24 from the cylindrical portions 18 of the adjacent ones of the power cells 14. Contact of the connector strips 24 to the negatively charged cylindrical portion 18 would short out the entire system. The connector insulating means includes a plurality of end walls 40 disposed at the ends of each of the partitioning walls 36, the end walls being substantially perpendicular to each of the partitioning walls. Each connector strip 24 extends between a first charged pole 16 of one power cell 14 and an oppositely charged pole 20 of a second power cell 14 while the end wall 40 is disposed between the connector strips 24 and the charged cylindrical portion 18 of the power cells 14. The end walls 40 further provide means for retaining each pair of stacked cells together. Finally, each end wall 40 provides for further structural rigidity of the housing means 35, as will be described below.

Figure 3:
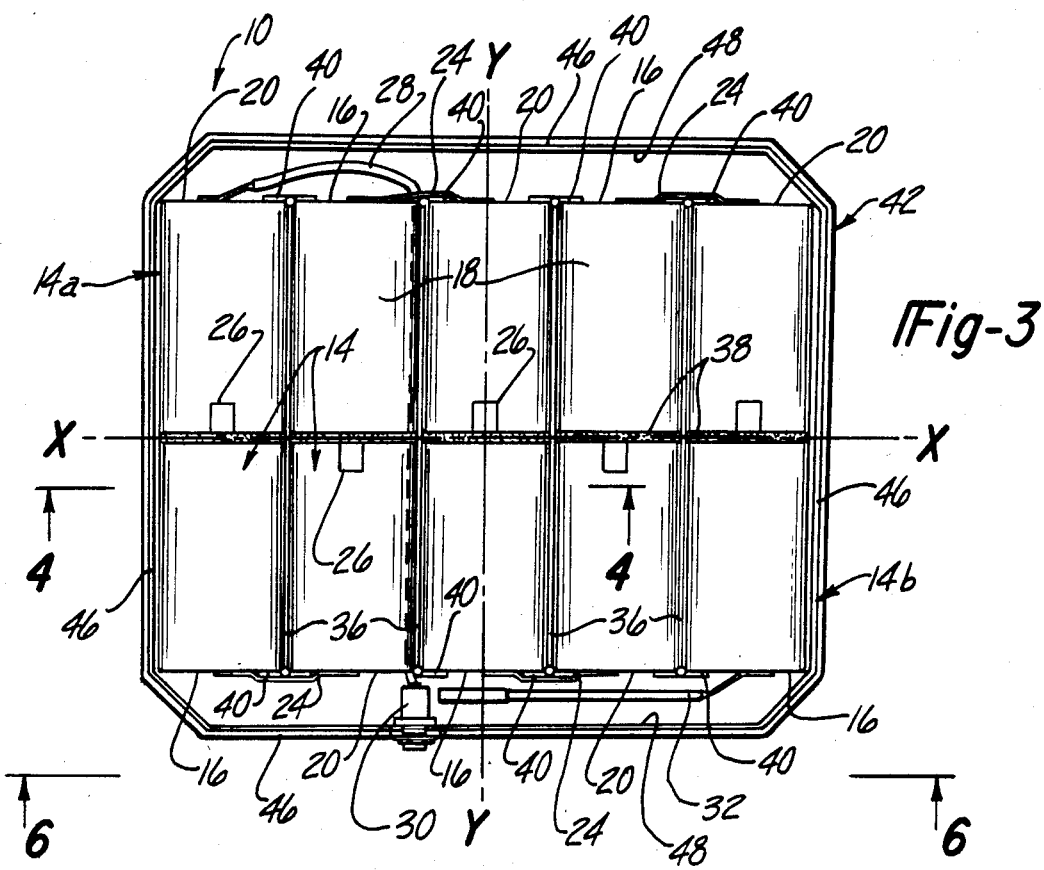
FIG. 3 is a top plan view of the base member of the assembly.

The housing means 35 includes a base member generally indicated at 42 in FIGS. 2, 3, 4, 5, 6 and 8. The base member 42 has a floor portion 44, the partitioning walls 36 extending upwardly from and across the floor portion 44. The base member 42 has side walls 46 extending upwardly from the floor portion 44 defining the outer periphery thereof. The side walls 46 adjacent each of the end walls 40 are spaced therefrom defining a channel 48 therebetween, as shown in FIG. 3. The connector strips 24, wire 32, and adaptor member 30 are disposed in the channel 48. The channel 48 further provides a buffer zone to allow for a slight compression of the side walls 46 upon external contact thereby further protecting the power cell assembly 10.

Figure 4:
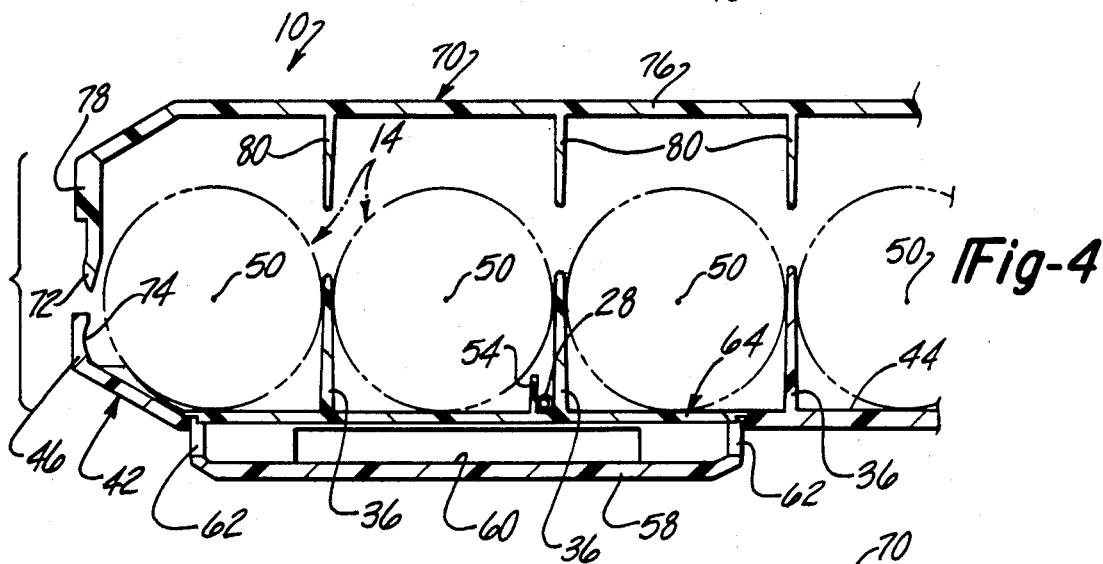
FIG. 4 is an enlarged cross-sectional view taken substantially along lines 4—4 of FIG. 3.
Figure 5:
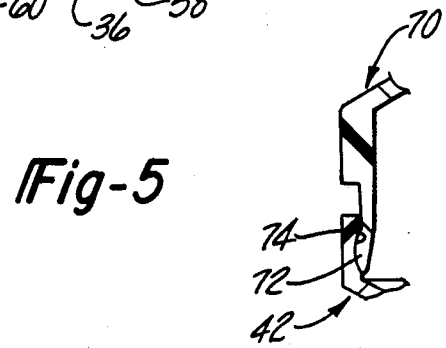
FIG. 5 is a cross-sectional fragmentary view of the connection between the lid member and the base member of the invention.
Figure 6:
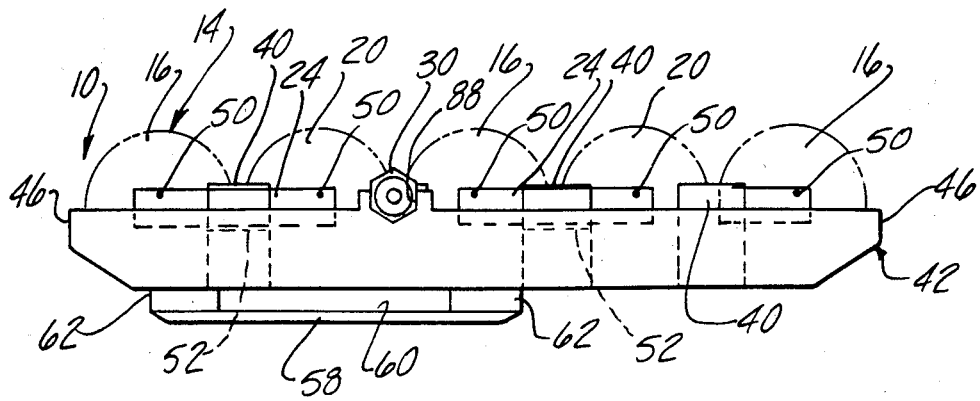
FIG. 6 is an elevational side view taken substantially along lines 6—6 of FIG. 3.
Figure 7:
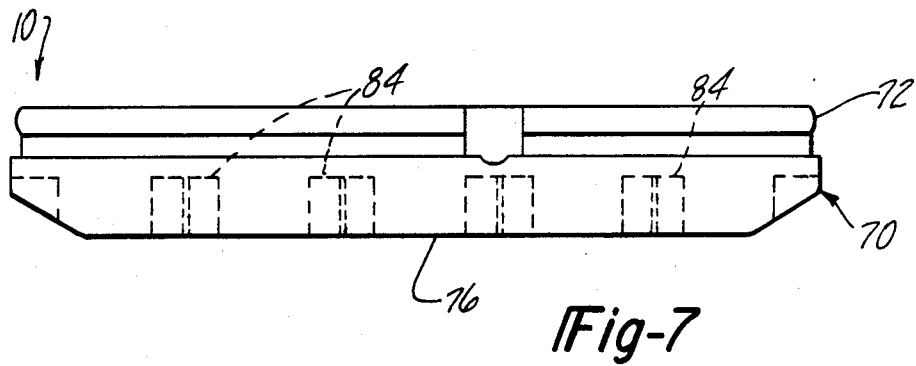
FIG. 7 is a side elevational view of the lid member of the invention.
Figure 8:
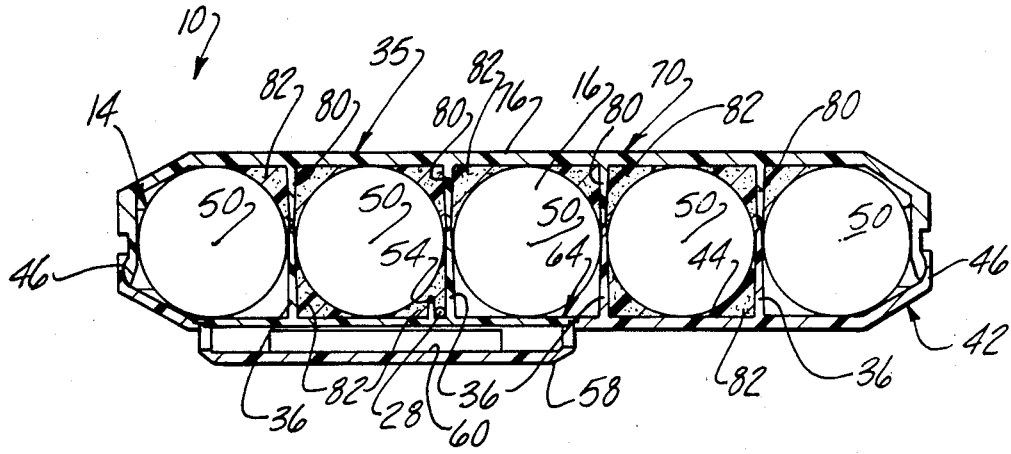
FIG. 8 is a cross-sectional view of the assembled power cell assembly.

The partitioning walls 36 extend from the floor portion 44 to a point above the side walls 46. More particularly, the partitioning walls extend to a point above the midpoint 50 of each of the power cells, as shown in FIGS. 4, 6, and 8. Thusly, the partitioning walls 36 effectively separate the charged cylindrical portions of the cells from the like charged cylindrical portions 18 of the adjoining cells 14 in the adjacent stack of power cells 14. The end walls 40 include connector strip support means supporting the connector strips 24 adjacent the end walls 40. The connector strip support means includes a lip 52 extending outwardly from each of the end walls 40 and defining an upper portion of the end walls above the lip 52, the upper portion of the end walls 40 extending to a point above the proximately disposed side wall 46. Each connector strip 24 has an end connected to the power cell 16 and the central portion of the connector strip rests upon the lip 52. The upper portion of each of the end walls 40 rises above the height of each side wall 46 so as to expose each of the connector strips 24 above the adjacent side wall 46. In the manner, there is access to each of the connector strips so that they may be easily soldered or otherwise connected to the power cell 14 in an efficient and simple manner. In other words, the positioning of the lip 52 so that the connector strips 24 are disposed above the side walls 46 exposes the connectors strips so that there is easy access of any equipment such as a soldering iron or welding gun to allow for efficient and simply access to the strips 24 for connection of the strips 24 to the power cells 14.

The assembly 10 includes wire guide means for guiding the wire 28 along the floor portion 44 adjacent one of the partitioning walls 36. The wire guide means includes a wire guide channel extending along the floor portion 44 adjacent one of the partitioning walls 36 whereby the wire 28 is force fit into the channel to be retained therein. A flange 54 extends upwardly from the floor portion 44 and is substantially parallel to and spaced from the adjacent partitioning wall 36 and defines the channel therebetween.

The assembly 10 includes belt retaining means for retaining the assembly 10 on the belt schematically shown at 56 in FIG. 1. The base member 42 includes a projection 58 extending downwardly therefrom, the belt retaining means including passageways 60 extending through the projection 58 for receiving the belt 56 therethrough. More particularly, the belt retaining means includes the first passageway 60 and a second passageway 61, the second passageway 61 being perpendicular to and intersecting with the first mentioned passageway 60. Thusly, a belt may be threaded through the first passageway 60 or through the second passageway 61 depending upon the user's preference. The base member 42 has a substantially flat outer surface. The projection 58 includes a substantially planar portion spaced from and parallel to the outer surface of the base member 42. The projection 58 further includes a plurality of legs 62 connecting the planar portion of the projection 58 to the outer surface of the base member 42, the passageway 60 extending between the planar portion of the projection 58 and the outer surface of the base member 42 and between the legs 62. The floor portion 44 has a downwardly recessed portion defining the projection 58. The assembly 10 includes an insert member generally indicated at 64 disposed over the recessed portion having a first surface being continuous with the remainder of the floor portion 44 and a second surface being the portion of the outer surface of the base member 42 within the passageway 60 of the projection 58 and 20 spaced from the planar portion thereof. The insert member 64 includes two upstanding walls 66 extending therefrom and defining a portion of a corresponding one of the partitioning walls 36 when the insert member 64 is disposed over the recessed portion. The insert member 64 further includes the flange 54 of the wire guide means, the flange 54 being disposed adjacent to and spaced from the upstanding walls 66 of the insert member 64. The floor portion 67 of the insert 64 which extends away from the wall 66 adjacent the flange 54 extends a greater distance away therefrom than the floor portion 69 which extends from the other wall 66 of the insert member 64. In other words, the floor portion 67 of the insert is wider as it extends from the wall 66 than the floor portion 69 thereof. Thusly, the base member 42 of the invention includes a projection 58 providing belt retaining means wherein the projection 58 is integral with the base member 42. This construction provides belt retaining means which is not easily broken off from the base member 42. Further, the assembly is compact in that the insert member 64 provides for a continuous floor portion 44 and continuous partitioning walls 36. Further, the base member can be molded in a single unit wherein the partitioning walls 36, belt retaining means, and side walls are an integral unit.

The assembly 10 includes power cell retaining means for retaining the power cells 14 between the partitioning walls 36 and the adjacent floor portion 44. The power cell retaining means includes a lid member generally indicated at 70 for completely enclosing the power cells 14 within the housing 35. The lid member includes engagement means for reversibly connecting the base member 42 to the lid member 70. The engagement means comprises a lip portion 72 of the lid member 70 which reversibly engages an inwardly curved depression in 74 in the side wall 46 of the base member 42.

The lid member 70 includes a substantially planar cover portion 76 and side walls 78 extending downwardly therefrom. The cover portion 76 engages the upper edge of the partitioning walls 36 to define power cell chambers for retaining the power cells 14 therein when the lid member 70 is connected to the base member 42 by the engagement means. More particularly, the partitioning means include a second plurality of partitioning walls 80 extending downwardly from the cover portion 76 of the lid member 70 for edge to edge contact with the partitioning walls 36 of the base member 42 to form the power cell chambers when the lid member 70 is connected to the base member 42 by the engagement means. The lid member 70 further includes end walls 84 each of the partitioning walls 80 of the lid member 70 are disposed between a pair of the end walls 84, the end walls 84 being in edge to edge contact with the end walls 40 of the base member 42 when the lid member 70 is connected to the base member 42. Thusly, the partitioning walls 36 and 80 and the end walls 40 and 84 meet in edge to edge contact to define the power cell chambers wherein the power cells 14 are retained. The partitioning walls 36 and 80 and end walls 40 and 84 further provide structural rigidity against compression of the housing 35. In other words, the partitioning walls 36 and 80 and end walls 40 and 84 provide insulation electrically and rigidity structurally to the assembly.

The assembly 10 further includes unitizing means for securing together the base member 42 and the lid member 70 and the power cells 14 as a unitized assembly. In other words, the unitizing means transforms the separate members into a substantially integral unit. The unitizing means includes an adhesive compound 82 disposed within the housing 35 and engaging the base member 42 and the lid member 70 and the power cells 14. Specifically, the adhesive compound 82 is disposed over the floor portion 44 between the first and second partitioning walls 36 and between the third and fourth partitioning walls 36, adhering to the power cells 14 between the partitioning walls 36, the adhesive being further disposed over the power cells 14 adhering the power cells 14 to the lid member 70, as shown in FIG. 8. In this manner, the adhesive compound 82 is disposed over the insert member 64 between the first and second partitioning walls 36 thereby further securing the insert member 64 and wire 28 within the assembly 10.

The invention further provides a method of making the power cell assembly 10 including the steps of disposing a plurality of the power cells 14 between the partitioning walls 36 of the base member 42 and adjacent the floor portion 44 thereof, thereby utilizing the base member 42 as an assembly tool. The power cells 14 are then electrically connected in series within the base member 42 and the assembly is enclosed to provide external insulation between the connected power cells 14 and the external environment. Thusly, the nickel cadmium power cells 14 which are quite powerful and dangerous to handle are initially disposed into the base member 42 and all further electrical connections are made while the cells 14 are retained within the base member 42. The method is further defined by including the steps of securing the electrical adaptor 30 within a mount portion 88 of the base member 42 and disposing the liquid adhesive 82 between the first and second partitioning walls 36 and the third and fourth partitioning walls 36. The power cells 14 are then disposed in the channels between the partitioning walls 36. The power cells 14 are electrically connected in series within the base member 42 and the wires 28 and 32 are connected between the adaptor 30 and each of the end power cells 14a and b of the series. Finally, the lid member 70 is secured over the base member 42 to encapsulate and insulate the connected power cells 14 while exposing the electrical adaptor 30 for connection to the video equipment 12.

The step of electrically connecting the power cells 14 together is further defined by disposing the power cells 14 having the conductive strips 26 secured thereto in a stack against another power cell 14, aligning the conductive strips 26 adjacent to the oppositely charged cylindrical portion 18 of the other power cell 14 in the stack while disposing the insulating ring 38 between the aligned power cells 14. The exposed end of the conductive strips 26 are operatively connected to the cylindrical portion 18 of the power cells 14 and the oppositely charged exposed ends of the remaining power cells 14 are connected in series.

The method further includes the steps of disposing the insert member 64 over the recess portion of the base member 42 to form the first and second partitioning walls 36 and the floor portion 44 therebetween and applying the liquid adhesive compound 82 over the floor portion 44 between the first and second partitioning walls 36 before disposing the power cells 14 thereon.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that within the scope of the appended claims wherein reference numerals are merely for convenience and are not to be in any way limiting, the invention may be practiced otherwise that is specifically described.

What is claimed is:

1. A portable power cell casing assembly (10) for housing a plurality of power cells (14), said assembly (10) comprising: an outer nonconductive housing (35) for supporting the power cells (14), and characterized by partitioning means for separating and insulating the charged cylinder portion of adjacent aligned power cells from each other, said partitioning means including connector insulating means for insulating and separating conductive connector strips extending around the ends of said partitioning means (36) from the adjacent cells, said partitioning means including at least one partitioning wall (36) extending across said housing (35) for separating the adjacently aligned power cells (14) and said connector insulating means including at least one end wall (40) disposed at the end of at least one of said partition walls (36) and being substantially perpendicular thereto whereby a connector strip (24) extends about said end wall and between a first charged pole (16) of on power cell (14) and an oppositely charged pole (20) of a second power cell (14).

2. An assembly as claimed in claim 1 further characterized by said partioding walls (36) being flexible.

3. An assembly as claimed in claim 1 further characterized by said housing means (35) including a base member (42) having a floor portion (44), said partitioning walls (36) extending upwardly from and across said floor portion (44), said assembly (10) including cell retaining means for retaining the power cells (14) between said partitioning walls (36) and adjacent said floor portion (44).

4. An assembly as claimed in claim 3 further characterized by said base member (42) including side walls (46) extending upwardly from said floor portion (44), said side walls (46) adjacent said end wall (40) being spaced therefrom defining a channel (48) therebetween.

5. An assembly as claimed in claim 4 further characterized by said partitioning walls (36) and said end walls (40) extending from said floor portion (44) to a point above said side walls (40).

6. An assembly as claimed in claim 5 further characterized by said end walls (40) including connector strip support means for supporting the connector strips (24) adjacent said end walls (40).

7. An assembly as claimed in claim 6 further characterized by said connector strip support means including a lip (52) extending outwardly from at least one of said end walls (40) and defining an upper portion of said end wall above said lip (52), said upper portion of said end wall (40) extending to a point above said proximate side wall (46).

8. An assembly as claimed in claim 7 further characterized by including wire guide means for guiding a wire (28) along said floor portion (44) adjacent at least one of said partitioning walls (36).

9. An assembly as claimed in claim 8 further characterized by said wire guide means including a wire guide channel extending along said floor portion (44) adjacent at least one of said partitioning walls (36) whereby a wire (28) is force fit into said channel to be retained therein.

10. An assembly as claimed in claim 9 further characterized by including a flange (54) extending upwardly from said floor portion (44) and substantially parallel to and spaced from at least one of said partitioning walls (36) and defining said channel therebetween.

11. An assembly as claimed in claim 8 further characterized by including belt retaining means for retaining said assembly (10) on a belt (56).

12. An assembly as claimed in claim 11 further characterized by said base member (42) including a projection (58) extending downwardly therefrom, said belt retaining means including at least one passageway (60) extending through said projection for receiving a belt (56) therethrough.

13. An assembly as claimed in claim 12 further characterized by said belt retaining means including a second passageway (61) being perpendicular to and intersecting with its first mentioned passageway (60).

14. An assembly as claimed in claim 13 further characterized by said base member (42) having a substantially flat outer surface, said projection (58) including a substantially planar portion spaced from and parallel to said outer surface of said base member (42) and a plurality of spaced legs (62) connecting said planar portion to said outer surface of said base member (42), said passageways (60), (61) extending between said planar portion and said outer surface and through said legs (62).

15. An assembly as claimed in claim 14 further characterized by said floor portion (44) having a downwardly recessed portion defining said projection (58), said assembly (10) including an insert member (64) disposed over said recessed portion and having a first surface being continuous with the remainder of said floor portion (44) and a second surface being said portion of said outer surface of said base member (42) within said passageway (60) of said projection (58) and spaced from said planar portion.

16. An assembly as claimed in claim 15 further characterized by said insert member (64) including at least one upstanding wall (66) extending therefrom defining a portion of a corresponding one of said partitioning walls (36) when said insert member (64) is disposed over said recessed portion.

17. An assembly as claimed in claim 16 further characterized by said insert member (64) including said flange (54) of said wire guide means, said flange (54) being disposed adjacent to and spaced from said upstanding wall (66) of said insert member (64).

18. An assembly as claimed in claim 17 further characterized by said floor portion (67) of said insert member (64) which extends away from said wall (66) adjacent said flange (54) extending a greater distance away therefrom than said floor portion (69) which extends from said other wall (66) of said insert member (64).

19. An assembly as claimed in claim 4 further characterized by said power cell retaining means including a lid member (70) for completely enclosing the power cells (14) within said housing (35), said lid member (70) including engagement means for reversibly connecting said base member (42) to said lid member (70).

20. An assembly as claimed in claim 19 further characterized by said lid member (70) including a substantially planar cover portion (76) and side walls (78) extending downwardly therefrom, said cover portion (76) engaging the upper edge of said partitioning walls (36) to define power cell chambers for retaining the power cells (14) therein when said lid member (70) is connected to said base member (42) by said engagement means.

21. An assembly as claimed in claim 20 further characterized by said partitioning means including a second plurality of partitioning walls (80) extending downwardly from said cover portion (76) of said lid member (70) for edge to edge contact with said partitioning walls (36) of said base member (42) to form said power cell chambers when said lid member (70) is connected to said base member (42) by said engagement means.

22. An assembly as claimed in claim 21 further characterized by said lid member (70) including end walls (84) extending downwardly from said cover portion (76), each of said partitioning walls (80) of said lid member (70) being disposed between a pair of said end walls (84), said end walls (84) being in edge to edge contact with said end walls (40) of said base member (42) when said lid member (70) is connected to said base member (42) by said engagement means.

23. An assembly as claimed in claim 22 further characterized by said engagement means including a lip portion (72) extending downwardly from said side walls (78) of said lid member (70) which is curved outwardly and a curved depression extending inwardly into said sidewalls of said base member (42) adjacent to the upper edge thereof for reversible engagement with said lip portion (72) to retain said lid member (70) upon said base member (42).

24. A power cell assembly (10) for operating video equipment (12) comprising:
  a plurality of power cells (14) each having a charged first pole (16) and like charged cylindrical portion (18) and an oppositely charged second pole (20) and inslulation disposed therebetween;
  connector means for electrically connection each of said power cells (14) in series to operate the video equipment (12); and
  housing means (35) for supporting said power cells (14) and connector means, said assembly (10) characterized by including nonconductive partitioning means within said housing means (35) for insulating and separating said charged cylindrical portions (18) of the adjacent ones of said power cells (14) from each other, said connector means including conductive connector strips (24) operatively connecting said power cells (14) in series and extending around the end of at least one of said partitioning walls (36), said partitioning means including connector insulator means for insulating and separating said connector strips (24) from said cylindrical portions (18) of the adjacent ones of said power cells (14), said connector insulating means including at least one end wall (40) disposed at the end of at least one of said partitioning walls (36) and being substantially perpendicular thereto whereby said connector strip (24) extends between said first charged pole (16) of one of said power cells (14) and said oppositely charged pole (20) of a second of said power cells (14) while said end wall (40) is disposed between said connector strip (24) and said charged cylindrical portion (18) of said power cells (14).

25. An assembly as claimed in claim 24 further characterized by said partitioning means including at least one partitioning wall (36) extending across said housing (35) for separating said charged cylindrical portions (18) of adjacently aligned power cells (14).

26. An assembly as claimed in claim 25 further characterized by said partitioning walls (36) being flexible.

27. An assembly as claimed in claim 26 further characterized by said housing means (35) including a base member (42) having a floor portion (44), said partitioning walls (36) extending upwardly from and across said floor portion (44), said assembly (10) including cell retaining means for retaining said power cells (14) between said partitioning walls (36) and adjacent to said floor portion (44).

28. An assembly as claimed in claim 27 further characterized by said base member (42) including side walls (46) extending upwardly from said floor portion (44), said side walls (46) adjacent said end wall (40) being spaced therefrom and defining a channel (48) therebetween.

29. An assembly as claimed in claim 28 further characterized by said partitioning walls (36) and said end walls (40) extending from said floor portion (44) to a point above said side walls (40).

30. An assembly as claimed in claim 29 further characterized by said cylindrical portion (18) of said power cells (14) having central longitudinal axis (50) and said partitioning walls (36) extending upwardly to a point above said central longitudinal axis (50).

31. An assembly as claimed in claim 30 further characterized by said end walls (40) including connector strip support means for supporting said connector strips (24) adjacent said end walls (40).

32. An assembly as claimed in claim 31 further characterized by said connector strip support means including a lip (52) extending outwardly from at least one of said end walls (40) and defining an upper portion of said end wall above said lip (52), said upper portion of said end wall (40) extending to a point above said side wall (46).

33. An assembly as claimed in claim 24 further characterized by said housing means (35) including a base member (42) including a floor portion (44) and said partitioning means including four spaced and parallel partitioning walls (36) extending upwardly from said floor portion (44), said power cells (14) being aligned by and between said partitioning walls (36).

34. An assembly as claimed in claim 33 further characterized by said housing means (35) including a lid member (70), said lid member (70) including downwardly extending partitioning walls (80) corresponding to said partitioning walls (36) of said base member (42) to form five individual chambers containing said power cells (14) within said housing means (35) when said lid member (70) is mounted on said base member (42).

35. An assembly as claimed in claim 34 further characterized by including unitizing means for securing together said base member (42) and said lid member (70) and said power cells (14) as an unitized assembly.

36. An assembly as claimed in claim 35 further characterized by said unitizing means including an adhesive compound (82) disposed within said housing means (35) and engaging said base member (42) and said lid member (70) and at least several of said power cells (14).

37. An assembly as claimed in claim 36 further characterized by said adhesive compound (82) being disposed over said floor portion (44) between said first and second partitioning walls (36) and between the third and fourth of said partitioning walls (36) adhering to said power cells (14) between said partitioning walls (36), said adhesive being further disposed over said power cells (14) adhering to said lid member.

38. An assembly as claimed in claim 37 further including an insert member (64) defining a portion of said floor portion (44) adjacent said first and second partitioning walls (36) and a central portion of said first and second partitioning walls (36), said adhesive compound (82) being disposed over said insert member (64) between said first and second partitioning walls (36).

39. A portable video power cell casing (10) for housing a plurality of power cells (14) comprising:
an outer nonconductive housing (35) including a base member (42) having a base portion (44) and a lid member (70) having a cover portion (76);
a plurality of partitioning walls (36), (80) extending across said housing and between said cover portion (76) of said lid member (70) and said floor portion (44) of said base member (42), said partitioning walls (36) defining chambers therebetween for retaining the power cells (14) therein; and
a plurality of end walls (40), (84) extending between said floor portion (44) and said cover portion (76) and being substantially perpendicular to said partitioning walls (36), (80), each of said partitioning walls (36), (80) being disposed between a pair of said end walls (40), (84).

40. An assembly as claimed in claim 39 further characterized by including four of said partitioning walls (36) defining five of said chambers.

41. A portable video power cell casing (10) for housing a plurality of power cells (14) comprising:
a lid member (70);
a base member (42) including a floor portion (44) having a downwardly recessed portion defining a projection (58) on the opposite side of said base member (42), said projection (58) including a substantially planar portion and a plurality of spaced legs (62) which are integral with said floor portion and said planar portion; and an insert member (64) disposed over said recessed portion and having a first surface being continuous with the remainder of said floor portion (44) and a second surface facing the internal surface of said planar portion and defining a passageway therebetween.

42. A portable video power cell casing (10) as claimed in claim 41 including four spaced legs defining two passageways (60,61) between said insert (64) and said planar surface, said passageways (60,61) being perpendicular relative to each other.

43. A portable video power cell casing (10) as claimed in claim 42 wherein each of said legs (62) are disposed within said recessed portion, said legs (62) being connected to said floor portions (44) by flanges which are integral with said floor portion (44) and said legs (62), said insert (64) being seated upon said flanges.

* * * * *